(12) United States Patent  
Koestring et al.

(10) Patent No.: US 9,326,635 B2  
(45) Date of Patent: May 3, 2016

(54) BEVERAGE BREWING PACKAGE

(71) Applicant: Berry Plastics Corporation, Evansville, IN (US)

(72) Inventors: Darin C Koestring, Evansville, IN (US); Ryan Dewig, Evansville, IN (US); Milan C Maravich, Newburgh, IN (US)

(73) Assignee: Berry Plastics Corporation, Evansville, IN (US)

( * ) Notice: Subject to any disclaimer, the term of this patent is extended or adjusted under 35 U.S.C. 154(b) by 55 days.

(21) Appl. No.: 14/165,105

(22) Filed: Jan. 27, 2014

(65) Prior Publication Data

US 2014/0212546 A1    Jul. 31, 2014

Related U.S. Application Data

(60) Provisional application No. 61/756,969, filed on Jan. 25, 2013.

(51) Int. Cl.
| | | |
|---|---|---|
| *B65B 29/02* | (2006.01) | |
| *B65D 21/00* | (2006.01) | |
| *B65D 85/62* | (2006.01) | |
| *A47J 31/06* | (2006.01) | |
| *A47J 31/36* | (2006.01) | |
| *A47J 31/02* | (2006.01) | |

(52) U.S. Cl.
CPC .............. *A47J 31/0626* (2013.01); *A47J 31/02* (2013.01); *A47J 31/368* (2013.01)

(58) Field of Classification Search
CPC .............. A47J 31/0626; A47J 31/3695; B65D 21/0233; B65D 43/162; B65D 51/20; B65D 2251/105

USPC ............ 206/499, 503, 512, 519, 505; 426/77, 426/79; 99/295

See application file for complete search history.

(56) References Cited

U.S. PATENT DOCUMENTS

| | | | | |
|---|---|---|---|---|
| 3,077,284 | A | * | 2/1963 | McLaughlin .................. 220/780 |
| 3,530,917 | A | * | 9/1970 | Donovan ..................... 220/359.1 |
| 3,721,367 | A | * | 3/1973 | Fletcher ......................... 206/519 |
| 5,012,928 | A | * | 5/1991 | Proffitt et al. .................. 206/508 |
| 5,325,765 | A | | 7/1994 | Sylvan et al. |
| 5,840,189 | A | | 11/1998 | Sylvan et al. |
| D452,433 | S | | 12/2001 | Lazaris |
| D452,434 | S | | 12/2001 | Sweeney |
| 6,440,256 | B1 | | 8/2002 | Gordon et al. |
| D474,110 | S | | 5/2003 | Sweeney |
| D474,111 | S | | 5/2003 | Lazaris |
| 6,589,577 | B2 | | 7/2003 | Lazaris et al. |
| 6,607,762 | B2 | * | 8/2003 | Lazaris et al. ................... 426/79 |
| 6,645,537 | B2 | * | 11/2003 | Sweeney et al. ................ 426/79 |
| 6,655,260 | B2 | | 12/2003 | Lazaris et al. |
| D502,362 | S | | 3/2005 | Lazaris et al. |
| 7,328,651 | B2 | | 2/2008 | Halliday et al. |
| 7,531,198 | B2 | | 5/2009 | Cortese |
| D637,484 | S | * | 5/2011 | Winkler .......................... D9/429 |
| D647,398 | S | | 10/2011 | Winkler |
| D647,399 | S | | 10/2011 | Winkler |
| 8,252,351 | B2 | | 8/2012 | Ozanne |
| 8,361,527 | B2 | * | 1/2013 | Winkler et al. .................. 426/79 |
| 8,685,479 | B2 | | 4/2014 | Dogan et al. |
| 2004/0045443 | A1 | | 3/2004 | Lazaris et al. |

(Continued)

*Primary Examiner* — Chun Cheung  
(74) *Attorney, Agent, or Firm* — Barnes & Thornburg LLP (57) ABSTRACT

A beverage brewing package includes a cup and a filter bag. The filter bag is supported in an interior region formed in the cup.

21 Claims, 5 Drawing Sheets

(56) References Cited

U.S. PATENT DOCUMENTS

| | | |
|---|---|---|
| 2005/0051478 A1* | 3/2005 | Karanikos et al. ............ 210/469 |
| 2005/0287251 A1 | 12/2005 | Lazaris et al. |
| 2010/0303964 A1 | 12/2010 | Beaulieu et al. |
| 2011/0151075 A1 | 6/2011 | Peterson |
| 2012/0308688 A1 | 12/2012 | Peterson et al. |
| 2013/0101716 A1 | 4/2013 | Beaulieu et al. |
| 2013/0122167 A1* | 5/2013 | Winkler et al. ............... 426/431 |

* cited by examiner

BEVERAGE BREWING PACKAGE

PRIORITY CLAIM

This application claims priority under 35 U.S.C. §119(e) to U.S. Provisional Application Ser. No. 61/756,969, filed Jan. 25, 2013, which is expressly incorporated by reference herein.

BACKGROUND

The present disclosure relates to one-cup beverage brewing systems, and particularly to grind packages for holding coffee, tea, or cocoa grinds in a filter bag during a one-cup beverage brewing cycle. More particularly, the present disclosure relates to a cup made of a plastics material and configured to hold a filter bag and mount in a brewing system to expose the grinds stored in the filter bag to pressurized hot water during a brewing cycle.

SUMMARY

A beverage brewing package in accordance with the present disclosure includes a cup having a bowl formed to include an interior region. In illustrative embodiments, the brewing package also includes coffee, tea, or cocoa grinds stored in filter bag retained in the interior region of the bowl.

In illustrative embodiments, the bowl is formed of a plastics material using a thermoforming process to include a series of teardrop-shaped stacking lugs in an upper portion of the bowl side wall and a series of upright liquid-flow channels in a lower portion of the bowl side wall. The cup also includes a brim coupled to the upper portion of the bowl side wall.

In illustrative embodiments, the upper portion of each bowl side wall also includes a lug-support rim located between the stacking lugs and the brim. When cups are stacked for shipment, the stacking lugs of a top cup are arranged to engage the lug-support rim of an underlying bottom cup to maintain a minimum separation distance between those two stacked cups so that the top cup does not become wedged or stuck in a nested position in the bottom cup.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figures 1, 2:
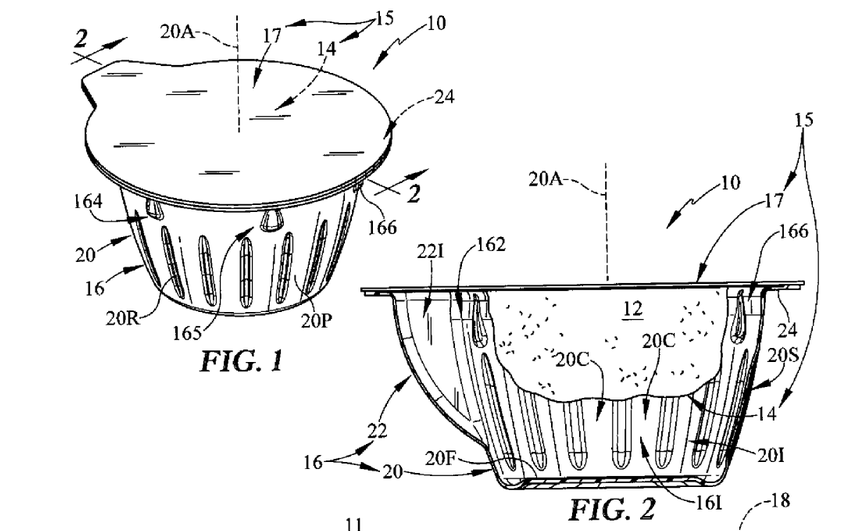
FIG. 1 is a perspective view of a beverage brewing package including a cup that has been made in accordance with the present disclosure using, for example, a thermoforming process.
FIG. 2 is a sectional view taken along lines 2-2 of FIG. 1 showing that the beverage brewing package includes a cup and a grinds carrier including a bag-supporting panel coupled to a brim of the cup and a filter bag containing grinds and mating with the underside of the bag-supporting panel to suspend the filter bag above a floor of the cup.

A beverage brewing package 10 in accordance with the present disclosure is shown in FIG. 1. Brewing package 10 is configured to store coffee grinds 12 in a filter bag 14 retained in a cup 16 as suggested in FIG. 3. A consumer can brew coffee 11 by placing brewing package 10 in a coffee maker 18 and exposing coffee grinds 12 stored in filler bag 14 to pressurized hot water discharged from hot water source 19 as suggested in FIG. 4. Brewing package 10 can also be used to brew tea or cocoa by storing tea or cocoa grinds in filter bag 14.

Cup 16 is formed to include several teardrop-shaped stacking lugs 161-166 shown, for example, in FIGS. 3 and 18-20. The stacking lugs 161-166 formed in cup 16 that cooperate with a lug-support rim 16R included in a neighboring cup 16' in a stack 100 of cups 16, 16' to provide means for maintaining a minimum separation distance $D_S$ between stacked cups 16, 16' as suggested in FIGS. 14-17 so that cups included in a stack 100 of cups that has been shipped to a brewing package assembly factory can be separated easily at that factory to facilitate manufacture and assembly of brewing packages 10.

Cup 16 includes a bowl 20 formed to include an interior region 20I and stacking lugs 161-166, a spout 22 coupled to bowl 20 and formed to include an interior region 22I placed in fluid communication with interior region 20I of bowl 20, and a brim 24 coupled to top edges of bowl 20 and spout 22 and configured to provide an uninterrupted border surrounding top openings into regions 20I, 22I as suggested in FIGS. 2, 3, 5, and 6. It is within the scope of the present disclosure to vary the size and shape of spout 22. Brim 24 includes a C-shaped segment 24C coupled to bowl 20 and a U-shaped segment 24U coupled to spout 22 as suggested in FIGS. 3 and 5.

Brewing package 10 includes a grinds carrier 15 comprising a bag-supporting panel 17 coupled to brim 24 of cup 16 and filter bag 14. Filter bag 14 mates with the underside of bag-supporting panel 17 to support filter bag 14 above floor 20F of bowl 20 as suggested in FIG. 2. Bag-supporting panel 17 is made of a metallic foil or a plastics film in illustrative embodiments of the present disclosure. Filter bag 14 is made of a water-permeable filter material and is configured to hold coffee, tea, or cocoa grinds or similar brewable particulates.

Figures 3, 4:
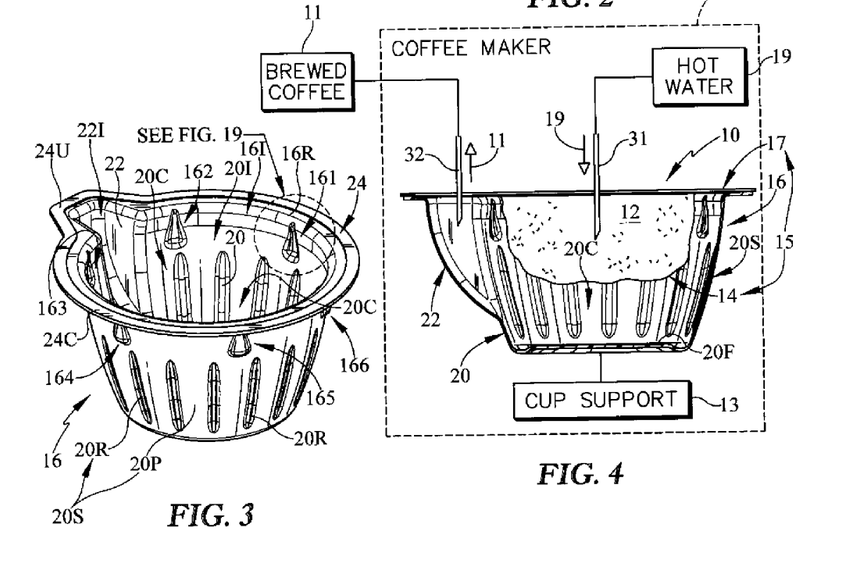
FIG. 3 is a perspective view of the cup of FIGS. 1 and 2 showing that the cup includes a bowl and a spout appended to the bowl and showing that the bowl is formed to include six circumferentially spaced-apart teardrop-shaped cup-stacking lugs.
FIG. 4 is a diagrammatic view of a one-cup beverage brewing system such as a coffee maker showing that the cup is supported on a cup support and pressurized hot water is admitted into the filter bag through an inlet cannula arranged to pierce a portion of the bag-supporting panel located over the bowl and brewed coffee is discharged from the cup through an outlet cannula arranged to pierce a portion of the bag-supporting panel located over the spout.

A diagrammatic view of a beverage brewing system such as a coffee maker 18 is provided in FIG. 4. Cup 16 of brewing package 10 is placed on a cup support 13 included in coffee maker 18. Pressurized hot water 19 is admitted into filter bag 14 through an inlet cannula 31 that is arranged to pierce a portion of bag-supporting panel 17 located over bowl 20. Brewed coffee 11 is discharged from cup 16 through an outlet cannula 32 arranged to pierce a portion of bag-supporting panel 17 located over spout 22. Brewed coffee 11 is produced by exposing pressurized hot water 19 to coffee grinds 12 carried in filter bag 14. Such brewed coffee 11 flows from interior region 20I of bowl 20 into interior region 22I of spout 22 and then exits brewing package 10 through outlet cannula 32 as suggested in FIG. 4. Cup 16 is not pierced during a coffee brewing cycle carried out using a brewing package 10 in a coffee maker 18.

Bowl 20 of cup 16 is formed to include a floor 20F and a side wall 20S as suggested in FIGS. 2 and 3. Side wall 20S has a somewhat frustoconical shape as suggested in FIGS. 2 and 3 with a narrow end alongside floor 20F and a relatively wider end alongside brim 24. Side wall 20S is coupled to spout 22 and arranged to extend upwardly from a perimeter edge of floor 20F toward brim 24 and cooperates with floor 20F to form interior region 20I of bowl 20 as suggested in FIG. 3.

Side wall 20S of bowl 20 is formed to include a series of upright liquid-flow channels 20C opening into interior region 20I of bowl 20 as suggested in FIGS. 2-4. Side wall 20S includes a generally frustoconical panel 20P extending from floor 20F to brim 24 and a series of circumferentially spaced radially inwardly extending ribs 20R. Each pair of adjacent ribs 20R is formed to define the radially inwardly facing liquid-flow channels 20C therebetween as suggested in FIGS. 3, 5, and 9. The liquid-flow channels 20C cooperate to provide means for allowing flow of pressurized brewed coffee 11 (or other brewed liquid) upwardly along an inner surface of side wall 20S toward outlet cannula 32 as suggested in FIG. 4.

Side wall 20S of bowl 20 is also formed to include a series of circumferentially spaced-apart stacking lugs 161-166 coupled to the generally frustoconical panel 20P as suggested in FIGS. 2, 3, and 5-8. Each pair of adjacent stacking lugs 161-166 is separated by a central included angle A60 of about 60° as suggested in FIG. 5. Cup 16 and its bowl 20 are made using a thermoforming process in accordance with the illustrative embodiments of the present disclosure to facilitate positive formation of ribs 20R and liquid-flow channels 20C and of stacking lugs 161-166 in side wall 20S of bowl 20.

Figure 14:
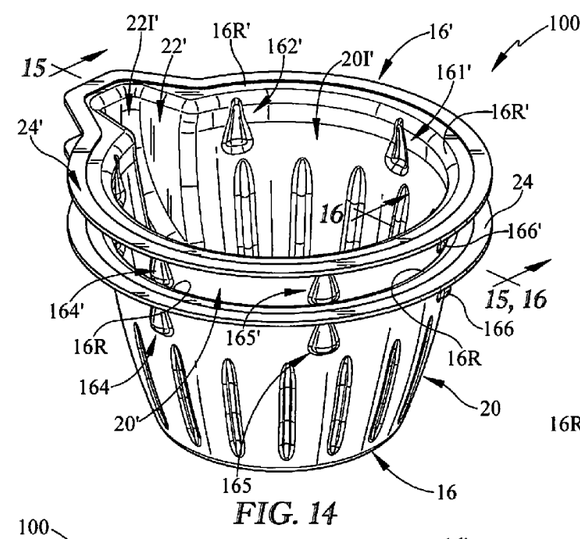
FIG. 14 is a perspective view showing a stack of two cups of the type shown in FIG. 3.
Figure 15:
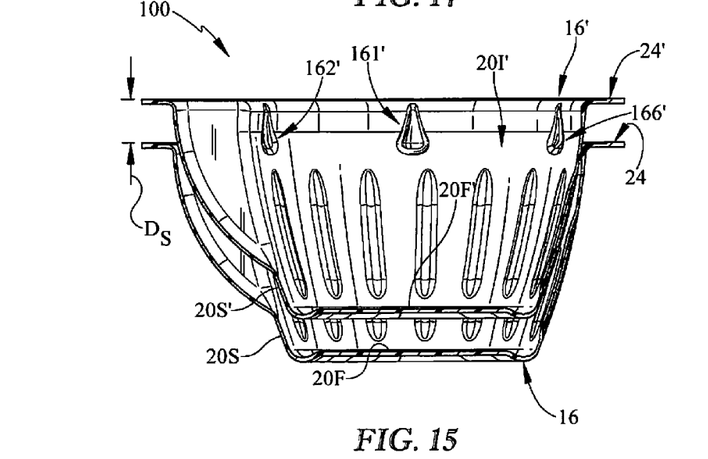
FIG. 15 is a sectional view taken along lines 15-15 of FIG. 14.
Figure 16:
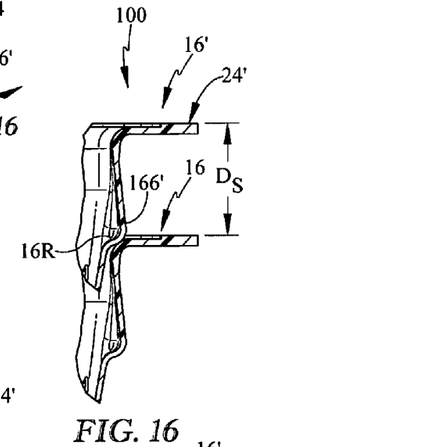
FIG. 16 is a partial sectional and perspective view taken along line 16-16 of FIG. 14 showing that a stacking lug of a top cup engages at lug-support rim of an underlying bottom cup to maintain a minimum separation distance ($D_S$) between the stacked top and bottom cups.
Figure 17:
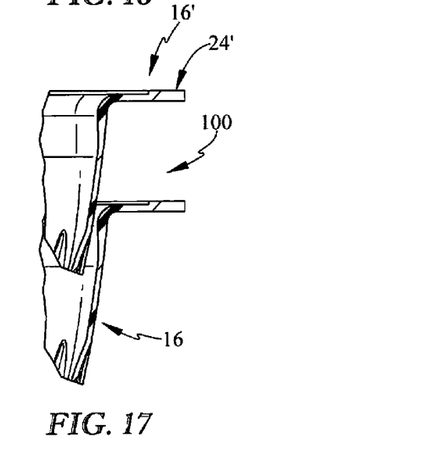
FIG. 17 is a partial sectional and perspective view taken along line 17-17 of FIG. 14.
Figure 18:
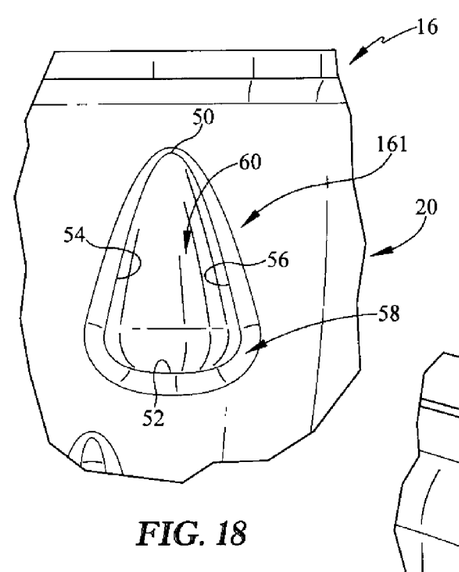
FIG. 18 is an enlarged view of an exterior portion of the bowl in the cup taken from the circles region shown in FIG. 6 showing one of the teardrop-shaped cup-stacking lugs included in the bowl.
Figure 19:
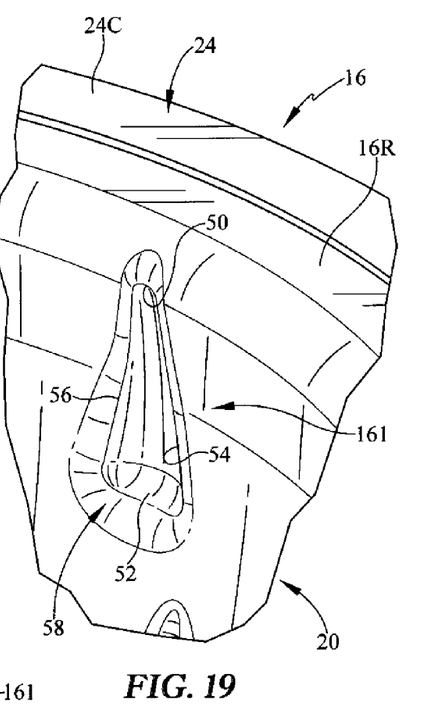
FIG. 19 is a perspective interior view of the bowl portion of FIG. 18.
Figure 20:
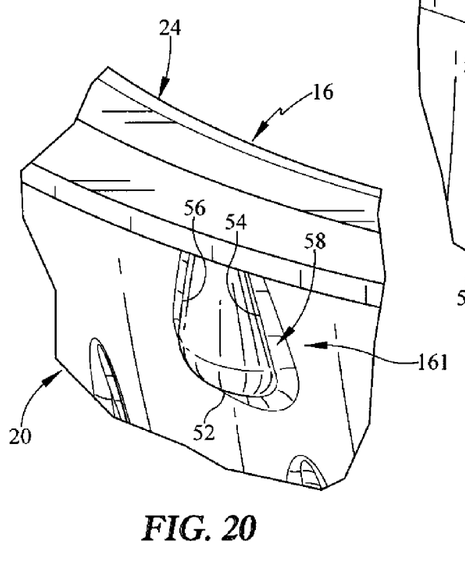
FIG. 20 is another perspective view of the teardrop-shaped cup-stacking lug shown in FIGS. 18 and 19.

Each stacking lug 161-166 is arranged to extend radially outwardly away from interior region 20I of bowl 20 to provide means for engaging a lug-support rim 16R provided in an upper portion of side wall 20S adjacent to C-shaped portion 24C of brim 24 as suggested in FIGS. 14 and 16. When stacking lugs 161-166 of cup 16 engage the lug-support rim 16R of an underlying cup 16' as suggested in FIGS. 14-17, then a minimum separation distance $D_S$ is maintained between stacked cups 16, 16' so as to avoid unwanted wedging of one cup in another underlying neighboring cup.

Each stacking lug 161-162 is teardrop-shaped as shown, for example, in FIGS. 3, 6, 14, and 18-20. Each lug 161-166 includes a narrow peak 50, a relatively wider base 52, and side edges 54, 56 diverging from peak 50 to base 52 as suggested in FIG. 18. An endless border 58 extends around peak 50, side edge 54, base 52, and side edge 56 as suggested in FIGS. 18 and 19. Border 58 surrounds an upside-down ice cream cone-shaped protrusion 60 as suggested in FIGS. 6 and 18. Protrusion 60 is bounded by peak 50, side edge 54, base 52, and side edge 52 as suggested in FIG. 18.

Side wall 20S of bowl 20 and its liquid-flow channel 20C and stacking lug 161-166 features are formed using a thermoforming process in accordance with illustrative embodiments of the present disclosure. Such a thermoforming production process causes formation of liquid-flow channels 20C in a lower portion of side wall 20S to keep an open path between side wall 20S and coffee grinds 12 in filter bag 14 and formation of teardrop-shaped stacking lugs 161-166. These features are positively formed in the cup 16 in accordance with the present disclosure. Such geometry changes allow for a relatively lighter cup 16 made using less plastics material.

A cup 16 for use in a beverage brewing package 10 includes a bowl 20 formed to include an interior region 20I as suggested in FIG. 3. In illustrative embodiments, brewing package 10 also includes coffee, tea, or cocoa grinds stored in filter bag 14 retained in interior region 20I of bowl 20.

In illustrative embodiments, bowl 20 is formed of a plastics material using a thermoforming process to include a series of teardrop-shaped stacking lugs 161-166 in an upper portion of the bowl side wall 20S and a series of upright liquid-flow channels 20C in a lower portion of the bowl side wall 20S as suggested in FIGS. 3 and 5-8. The cup 16 also includes a brim 24 coupled to the upper portion of the bowl side wall 20S.

In illustrative embodiments, the upper portion of each side wall 20S also includes a lug-support rim 16R located between the stacking lugs 161-166 and the brim 24. When cups 16, 16' are stacked for shipment, the stacking lugs 161-166 of a top cup 16 are arranged to engage the lug-support rim 16R of an underlying bottom cup 16' to maintain a minimum separation distance $D_S$ between those two stacked cups 16, 16' so that the top cup 16 does not become wedged or stuck in a nested position in the bottom cup 16'.

In a beverage brewing package system in accordance with the present disclosure, a stackable first cup 16 and an overlying stackable second cup 16' are provided as shown, for example, in FIGS. 14-17. These cups 16, 16' are configured to provide a minimum separation distance ($D_S$) between brims 24, 24' when the cups 16, 16' are stacked as suggested in FIGS. 14-17.

First cup 16 includes a bowl 20 formed to include an interior region 20I and a spout 22 formed to include an interior region 22I as shown in FIGS. 3 and 14. Spout 22 is coupled the bowl 20 to place interior region 22I of spout 22 in fluid communication with interior region 20I of bowl 20. Cup 16 also includes a brim 24 coupled to top edges of bowl 20 and spout 22 and configured to provide an uninterrupted border surrounding top openings into the interior regions 20I, 22I of bowl 20 and spout 22.

Bowl 20 includes a bowl floor 20F and a bowl side wall 20S arranged to extend from bowl floor 20F to brim 24 as shown, for example, in FIG. 2. Bowl side wall 20S is also arranged to extend around a central axis 20A that is generally perpendicular to bowl floor 20F to define interior region 20I of bowl 20 as suggested in FIGS. 1, 2, and 5.

Bowl side wall 20S is formed to include a series of stacking lugs 161-166 and a lug-support rim 16R as shown, for example, in FIGS. 3 and 14. Stacking lugs 161-166 are arranged to extend radially outwardly away from central axis 20A and interior region 20I of bowl 20 as suggested in FIG. 8. Stacking lugs 161-166 are arranged to lie in spaced-apart relation to one another about bowl side wall 20S as suggested in FIGS. 3 and 5. Lug-support rim 16R is arranged to lie between a portion of brim 24 that is coupled to bowl side wall 20S and the series of stacking lugs 161-166 as suggested in FIGS. 6 and 8. Lug-support rim 16R is configured to provide anti-wedging means for engaging stacking lugs 161-166 included in a companion stackable second cup 16' that is arranged to extend into interior region 20I of bowl 20 of first cup 16 when the first and second cups 16, 16' are stacked for shipment to maintain a minimum separation distance ($D_S$) between stacked first and second cups 16, 16' without causing the second cup 16' to become wedged in a nested position in an interior region 16I of the first cup 16 when stacking lugs 161'-166' included in the second cup 16' engage the lug-support rim 16R included in the first cup 16 as suggested in FIGS. 14-17.

Figure 6:
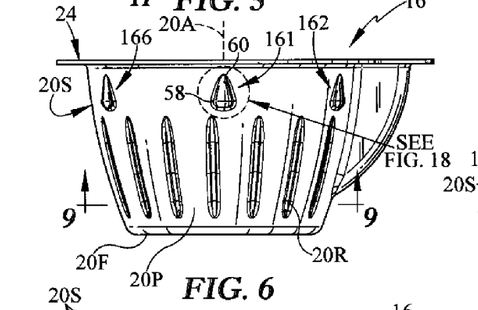
FIG. 6 is a front elevation view of the cup of FIG. 3 showing that three of the stacking lugs are formed in an upper portion of the bowl side wall and arranged to lie under the cup brim and above a series of vertically extending ribs formed in a lower portion of the bowl side wall.
Figure 7:
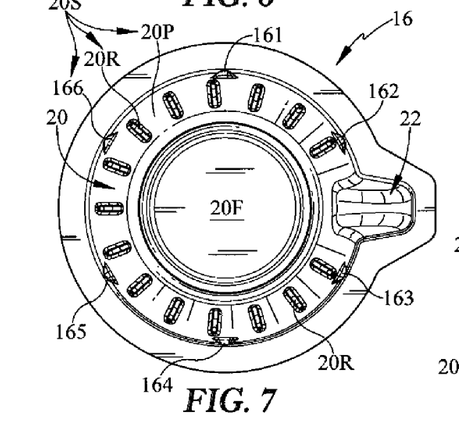
FIG. 7 is a bottom view of the cup of FIG. 3.
Figure 8:
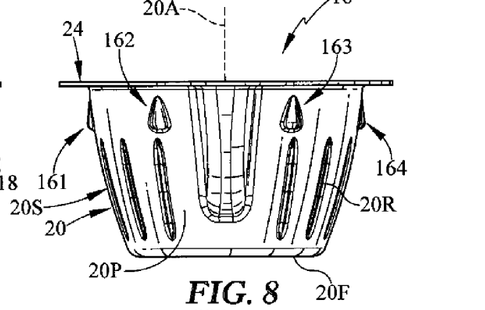
FIG. 8 is a side elevation view of the cup of FIG. 3.

Bowl side wall 20S of first cup 16 further includes a panel 20P arranged to extend upwardly from the floor 20F in a direction toward the portion of brim 24 as suggested in FIGS. 3 and 6. Panel 20F has a generally frustoconical shape in an illustrative embodiment. Each of the stacking lugs 161-166 is coupled to the generally frustoconical panel 20P and is hollow to define an interior region that cooperates with the interior regions of the bowl 20, the spout 22, and the other stacking lugs 161-166' to form the interior region 16I of cup 16. Each of the generally frustoconical panel and the stacking lugs has a uniform thickness and the uniform thicknesses are about equal to one another in illustrative embodiments of the present disclosure.

Bowl side wall 20S of first cup 16 further includes a series of radially inwardly extending ribs 20R coupled to the generally frustoconical panel 20P and arranged to extend radially inwardly into interior region 20I of bowl 20 toward the central axis 20A as suggested in FIG. 3. Each of the ribs 20R is hollow to define an interior region that is separated from interior region 20I of bowl 20 to open away from interior region 20I of bowl 20. Each of the generally frustoconical panel 20P and ribs 20R has a uniform thickness and the uniform thicknesses are about equal to one another in illustrative embodiments of the present disclosure. Spout 22, bowl floor 20F, panel 20P, stacking lugs 161-166, and ribs 24 cooperate to form a monolithic element having a generally uniform thickness as suggested in FIG. 2.

Figure 5:
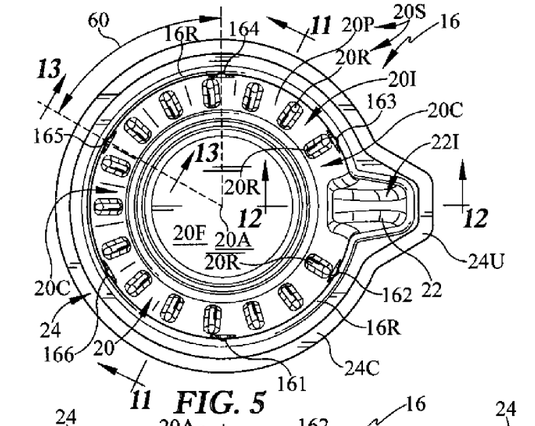
FIG. 5 is a top plan view of the cup of FIG. 3 showing that each pair of adjacent stacking lugs is separated by a central included angle of about 60°.

Each pair of adjacent stacking lugs 161-166 in the series of stacking lugs 161-166 is separated by a central included angle of about 60° as shown, for example, in FIG. 5. Each stacking lug 161-166 is teardrop-shaped and includes a protrusion comprising a narrow peak 50 arranged to lie in spaced-apart relation to bowl floor 20F, a relatively wider base 52 arranged to lie between narrow peak 50 and bowl floor 20F, and side edges 54, 56 extending and diverging from narrow peak 50 to the relatively wider base 52 as shown, for example, in FIGS. 18-20. Each stacking lug 161-166 further includes an endless border 58 extending around narrow peak 50, a first 54 of the side edges, relatively wide base 52, and a second 56 of the side edges, and being coupled to the generally frustoconical panel 20P along a perimeter edge thereof.

Figures 9, 10:
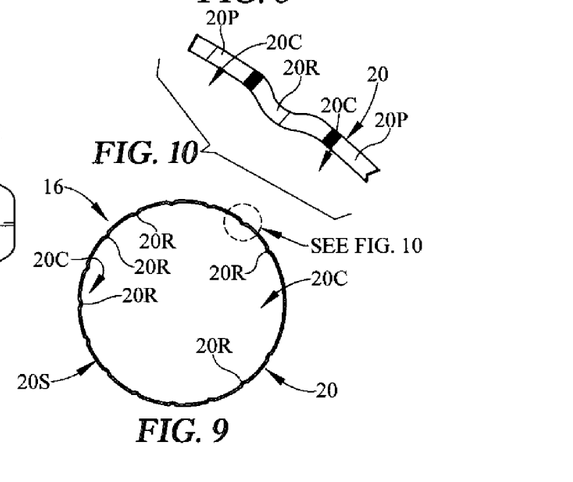
FIG. 9 is a dead-section view taken along line 9-9 of FIG. 6.
FIG. 10 is an enlarged portion of a side wall of the bowl of the cup of FIG. 6 taken from the circled region shown in FIG. 9.

Bowl side wall 20S has a substantially uniform thickness as suggested in FIG. 9. Spout 22 has a substantially uniform thickness that is about equal to the substantially uniform thickness of the bowl side wall 20S.

Figure 11:
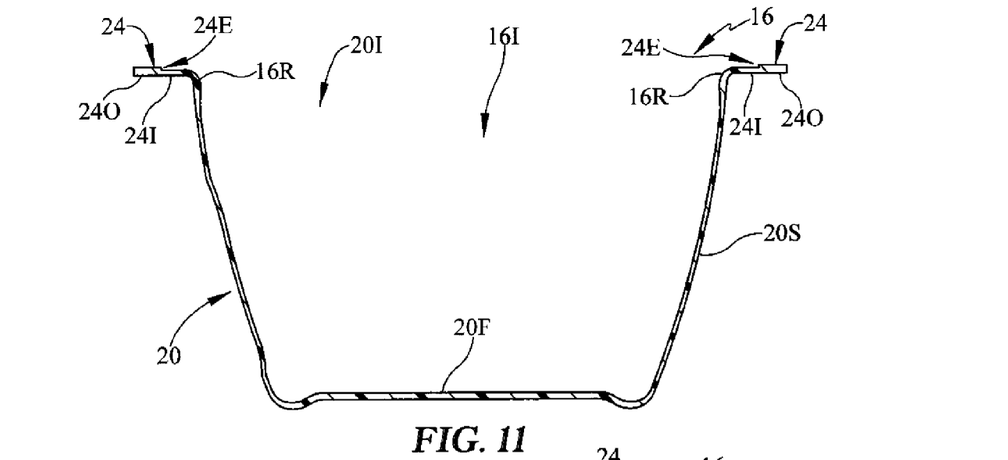
FIG. 11 is a sectional view of the cup taken along line 11-11 of FIG. 5.
Figure 12:
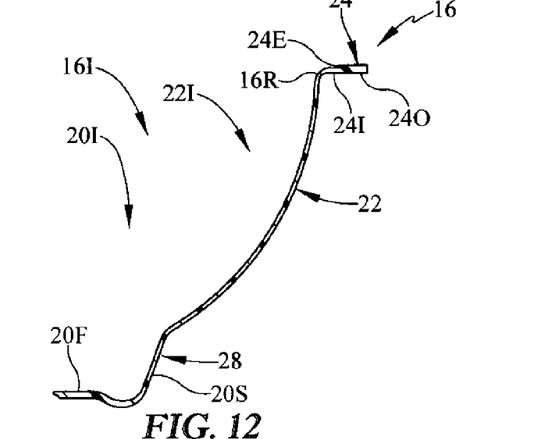
FIG. 12 is a partial sectional view of the cup taken along line 12-12 of FIG. 5.
Figure 13:
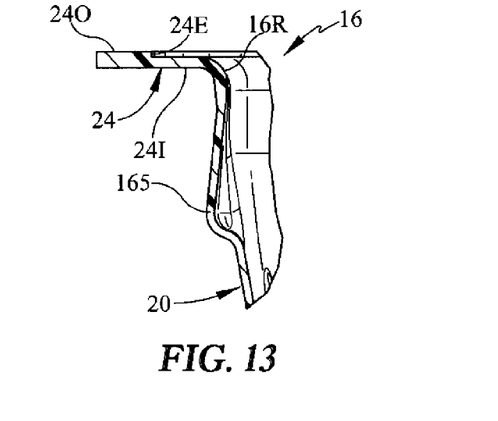
FIG. 13 is a partial sectional and perspective view taken along line 13-13 of FIG. 5 showing that a stacking lug is formed to include an interior region communicating with the interior region of the bowl and showing that the thickness of the stacking lug is about equal to the thickness of the bowl side wall in an illustrative embodiment.

Beverage brewing package 10 also includes a grinds carrier 15 including a bag-supporting panel 17 and a filter bag 14 coupled to an underside of bag-supporting panel 17 as suggested in FIG. 4. Brim 24 of first cup 16 includes a radially outer carrier-border rim 24O defining a perimeter edge of the brim 24 and a radially inner panel-support rim 24I arranged to lie between and interconnect the lug-support rim 164 and the radially outer lid-border rim 24O as suggested in FIGS. 11-13. A perimeter portion of the bag-supporting panel 17 has an underside mating with the radially inner panel-support rim 24I and an exterior side edge arranged to confront and be surrounded by a radially inwardly facing side edge 24E of the radially outer carrier-border rim 24O.

Bowl side wall 20S includes a panel 20P arranged to extend from bowl floor 20F to lug-support rim 16R as suggested in FIGS. 2 and 3. A lower portion of each stacking lug 161-166 is coupled to panel 20P, and an upper portion of each stacking lug 161-166 is coupled to lug-support rim 16R.

A stackable second cup 16' including a second bowl 20' formed to include an interior region 20I', a second spout 22' formed to include an interior region 22I' and coupled to second bowl 20' to place the interior region 22I' of second spout 22' in fluid communication with the interior region of second bowl 20', and a second brim 24' coupled to top edges of second bowl 20' and the second spout 22' and configured to provide an uninterrupted border surrounding top openings into the interior regions of second bowl 20' and second spout 22' as suggested in FIGS. 14-17. Second bowl 20' includes a second bowl floor 20F' and a second bowl side wall 20S' arranged to extend from second bowl floor 20F' to second brim 24' and around a central axis 20A that is generally perpendicular to second bowl floor 20F' to define the interior region 20I' of second bowl 20'.

Second bowl side wall 20S' is formed to include a series of stacking lugs 161'-166' arranged to extend radially outwardly away from the central axis 20A and the interior region 20I' of the second bowl side wall 20S' and lie in spaced-apart relation to one another about the second bowl side wall 20S' as suggested in FIG. 14. Each stacking lug in second cup 16' is arranged to engage a portion of the lug-support rim 16R of the stackable first cup 16 when the stackable second cup 16' is arranged to extend into the interior region 20I of bowl 20 of first cup 16 when the first and second cups 16, 16' are stacked for shipment to maintain a minimum separation distance ($D_s$) between the stacked first and second cups 16, 16' without causing the second cup 16' to become wedged in a nested position in an interior region of the first cup 16 when stacking lugs included in the second cup 16' engage the lug-support rim 16R included in the first cup 16.

A beverage brewing system comprises a monolithic element including a top hollow shell comprising bowl 20' and spout 22' is configured to form an interior region and to have a generally uniform thickness and a brim 24' that is coupled to an upper portion of the hollow shell 20', 22'. Brim 24' is configured to engage a bag-supporting panel 17' of a grinds carrier 15' to support a filter bag 14' included in the grinds carrier 15' coupled to an underside of the bag-supporting panel 17' in the interior region of the top hollow shell 20', 22'. Hollow shell 20', 22' is formed to include a series of hollow stacking lugs 161'-166' that cooperate to provide means for engaging a lug-support rim 16R included in an underlying bottom hollow shell 20, 22 that is formed to include an interior region sized to receive a lower portion of the top hollow shell 20', 22' therein when the top and bottom outer shells are stacked for shipment to maintain a minimum separation distance ($D_S$) between the stacked top and bottom outer shells without causing the top outer shell 20', 22' to become wedged in a nested position in the bottom outer shell 20, 22. Each of the top outer shell and bottom outer shell includes a cup and a spout coupled to the cup as suggested in FIGS. 14 and 15.

The invention claimed is:

1. A beverage brewing package system comprising a stackable first cup including a bowl formed to include an interior region, a spout formed to include an interior region and coupled to the bowl to place the interior region of the spout in fluid communication with the interior region of the bowl, and a brim coupled to top edges of the bowl and spout and configured to provide an uninterrupted border surrounding top openings into the interior regions of the bowl and the spout, wherein the bowl includes a bowl floor and a bowl side wall arranged to extend from the bowl floor to the brim and around a central axis that is generally perpendicular to the bowl floor to define the interior region of the bowl, the bowl side wall is formed to include a series of stacking lugs arranged to extend radially outwardly away from the central axis and the interior region of the bowl and lie in spaced-apart relation to one another about the bowl side wall and a lug-support rim arranged to lie between the brim that is coupled to the bowl side wall and the series of stacking lugs, and the lug-support rim is configured to provide anti-wedging means for engaging stacking lugs included in a companion stackable second cup arranged to extend into the interior region of the bowl of the first cup when the first and second cups are stacked for shipment to maintain a minimum separation distance between the stacked first and second cups without causing the second cup to become wedged in a nested position in an interior region of the first cup when stacking lugs included in the second cup engage the lug-support rim included in the first cup, wherein the brim defines an upwardly facing surface having a radially outer rim and a radially inner rim, the radially outer rim having a greater thickness than the radially inner rim, wherein the lug-support rim is spaced apart from and entirely below the upwardly facing surface of the brim.

2. The package system of claim 1, wherein the bowl side wall further includes a generally frustoconical panel arranged to extend upwardly from the floor in a direction toward the portion of the brim and each of the stacking lugs is coupled to the generally frustoconical panel and is hollow to define an interior region that cooperates with the interior regions of the bowl, the spout, and the other stacking lugs to form the interior region of the first cup.

3. The package system of claim 2, wherein each of the generally frustoconical panel and the stacking lugs has a uniform thickness and the uniform thicknesses are about equal to one another.

4. The package of claim 2, wherein the bowl side wall further includes a series of radially inwardly extending ribs coupled to the generally frustoconical panel and arranged to extend radially inwardly into the interior region of the bowl toward the central axis and each of the ribs is hollow to define an interior region that is separated from the interior region of the bowl to open away from the interior region of the bowl.

5. The package system of claim 4, wherein each of the generally frustoconical panel and ribs has a uniform thickness and the uniform thicknesses are about equal to one another.

6. The package system of claim 4, wherein the spout, bowl floor, panel, stacking lugs, and ribs cooperate to form a monolithic element having a generally uniform thickness.

7. The package system of claim 2, wherein each pair of adjacent stacking lugs in the series of stacking lugs is separated by a central included angle of about 60°.

8. The package system of claim 2, wherein each stacking lug is teardrop-shaped and includes a protrusion comprising a narrow peak arranged to lie in spaced-apart relation to the bowl floor, a relatively wider base arranged to lie between the narrow peak and the bowl floor, and side edges extending and diverging from the narrow peak to the relatively wider base.

9. The package system of claim 8, wherein each stacking lug further includes an endless border extending around the narrow peak, a first of the side edges, the relatively wide base, and a second of the side edges, and being coupled to the generally frustoconical panel along a perimeter edge thereof.

10. The package system of claim 1, wherein the bowl side wall has a substantially uniform thickness.

11. The package system of claim 10, wherein the spout has a substantially uniform thickness that is about equal to the substantially uniform thickness of the bowl side wall.

12. The package system of claim 1, further comprising a grinds carrier including a bag-supporting panel and a filter bag coupled to an underside of the bag-supporting panel and wherein the brim includes a radially outer carrier-border rim defining a perimeter edge of the brim and a radially inner panel-support rim arranged to lie between and interconnect the lug-support rim and the radially outer lid-border rim, and a perimeter portion of the bag-supporting panel has an underside mating with the radially inner panel-support member and an exterior side edge arranged to confront and be surrounded by the radially outer carrier-border rim.

13. The package system of claim 1, wherein the bowl side wall includes a panel arranged to extend from the bowl floor to the lug-support rim, a lower portion of each stacking lug is coupled to the panel, and an upper portion of each stacking lug is coupled to the lug-support rim.

14. The package system of claim 13, wherein each stacking lug is teardrop-shaped and includes a protrusion comprising a narrow peak coupled to the lug-support rim and arranged to lie in spaced-apart relation to the bowl floor, a relatively wider base coupled to the panel and arranged to lie between the narrow peak and the bowl floor, and side edges extending and diverging from the narrow peak to the relatively wider base.

15. The package system of claim 13, wherein each of the stacking lugs is hollow and is formed to include an interior region aligned in fluid communication with the interior region of the bowl.

16. The package system of claim 13, wherein each of the panel and the stacking lugs has a uniform thickness and the uniform thicknesses are about equal to one another.

17. The package system of claim 13, wherein the bowl side wall further includes a series of radially inwardly extending ribs coupled to the generally frustoconical panel and arranged to extend radially inwardly into the interior region of the bowl toward the central axis and each of the ribs is hollow to define an interior region that is separated from the interior region of the bowl to open away from the interior region of the bowl.

18. The package system of claim 17, wherein each of the panel and the ribs has a uniform thickness and the uniform thicknesses are about equal to one another.

19. The package system of claim 1, further comprising a stackable second cup including a second bowl formed to include an interior region, a second spout formed to include an interior region and coupled to the second bowl to place the interior region of the second spout in fluid communication with the interior region of the second bowl, and a second brim coupled to top edges of the second bowl and the second spout and configured to provide an uninterrupted border surrounding top openings into the interior regions of the second bowl and the second spout, wherein the second bowl includes a second bowl floor and a second bowl side wall arranged to extend from the second bowl floor to the second brim and around a central axis that is generally perpendicular to the second bowl floor to define the interior region of the second bowl, the second bowl side wall is formed to include a series of stacking lugs arranged to extend radially outwardly away from the central axis and the interior region of the second bowl side wall and lie in spaced-apart relation to one another about the second bowl side wall and each stacking lug in the second cup is arranged to engage a portion of the lug-support rim of the stackable first cup when the stackable second cup is arranged to extend into the interior region of the bowl of the first cup when the first and second cups are stacked for shipment to maintain a minimum separation distance between the stacked first and second cups without causing the second cup to become wedged in a nested position in an interior region of the first cup when stacking lugs included in the second cup engage the lug-support rim included in the first cup.

20. A beverage brewing system comprising a monolithic element including a top hollow shell configured to form an interior region and to have a generally uniform thickness and a brim coupled to an upper portion of the hollow shell and configured to engage a bag-supporting panel of a grinds carrier to support a filter bag included in the grinds carrier coupled to an underside of the bag-supporting panel in the interior region of the hollow shell, wherein the hollow shell is formed to include a series of hollow stacking lugs that cooperate to provide means for engaging a lug-support rim included in an underlying bottom hollow shell that is formed to include an interior region sized to receive a lower portion of the top hollow shell therein when the top and bottom outer shells are stacked for shipment to maintain a minimum separation distance between the stacked top and bottom outer shells without causing the top outer shell to become wedged in a nested position in the bottom outer shell, wherein the bowl side wall includes a panel arranged to extend from the bowl floor to the lug-support rim, a lower portion of each stacking lug is coupled to the panel, and an upper portion of each stacking lug extends into the lug-support rim, wherein the brim defines an upwardly facing surface having a radially outer rim and a radially inner rim, the radially outer rim having a greater thickness than the radially inner rim, wherein the lug-support rim is spaced apart from and entirely below the upwardly facing surface of the brim.

21. The package system of claim 20, wherein each of the top outer shell and bottom outer shell includes a cup and a spout coupled to the cup.

\* \* \* \* \*